United States Patent

Fisher

[19]

[11] Patent Number: 6,011,790

[45] Date of Patent: Jan. 4, 2000

[54] WIRELESS TERMINAL DATA NETWORK COMMUNICATION

[75] Inventor: Bradley J. Fisher, Unionville, Canada

[73] Assignee: Bell Mobility Cellular Inc., Etobicoke, Canada

[21] Appl. No.: 08/659,914

[22] Filed: Jun. 7, 1996

[51] Int. Cl.[7] .................................................. H04L 12/56
[52] U.S. Cl. .......................... 370/349; 370/401; 370/466
[58] Field of Search .................................... 370/328, 338, 370/395, 397–399, 389, 401, 402, 465, 466, 349; 455/403, 406, 408, 409, 410; 709/219

[56] References Cited

U.S. PATENT DOCUMENTS

| | | | |
|---|---|---|---|
| 5,144,649 | 9/1992 | Zicker et al. | 455/409 |
| 5,442,633 | 8/1995 | Perkins et al. | 370/389 |
| 5,444,763 | 8/1995 | Lazaridis et al. | 379/58 |
| 5,459,721 | 10/1995 | Yoshida | 370/401 |
| 5,479,400 | 12/1995 | Dilworth et al. | 370/331 |
| 5,541,925 | 7/1996 | Pittenger et al. | 370/94.1 |

FOREIGN PATENT DOCUMENTS

WO 97/36268   10/1997   WIPO.

*Primary Examiner*—Chau Nguyen
*Attorney, Agent, or Firm*—Foley & Lardner

[57] ABSTRACT

A gateway computer is connected to a wireless station switch which receives and sends transaction processing data between remote terminals and a transaction processing host. The gateway interprets an exception code in the data packet received from the terminals to determine whether data is to be forwarded or whether a predetermined circuit management activity is to be carried out by the gateway for the purposes of call request, call accepting, acknowledging, negative acknowledging, call clear requesting, call clear confirming or call reset confirming. The terminals make use of the exception code to make it easier for the gateway to either pass on data or carry out the predetermined circuit management activity while reducing both the amount of interpretation and processing required by the gateway and reducing over-the-air traffic between the terminals and the wireless station.

26 Claims, 4 Drawing Sheets

WIRELESS TERMINAL DATA NETWORK COMMUNICATION

FIELD OF THE INVENTION

The present invention relates to a method and apparatus for network data communication in which data is transmitted between a plurality of remote terminals, such as point of-sale (POS) terminals, and a transaction processing host computer, such as a debit or credit authorization host.

BACKGROUND OF THE INVENTION

The use of POS terminals for validating credit card and bank debit card payments in retail establishments is row widespread. In the present system architecture, there are two principle ways of connecting to the financial transaction processing host computer in order to communicate the necessary data packet messages to effect electronic payment, either by credit card, debit card or electronic funds transfer (EFT), as well as process other standardized administrative functions. The most common way in which a POS terminal communicates with the financial transaction processing host computer is to use an ordinary telephone line and to dial the telephone number of a bank of modems which will answer the POS terminal's call. When the POS terminal and one of the bank of modem have synchronized and established modem communication over the telephone line, the POS terminal sends a request for a financial transaction. Typically, the bank of modems are connected to a packet assembler-disassembler (PAD), which in turn is connected to a packet-switching data network. The financial transaction processing host computer is connected to the PAD. The PAD switches and translates message packets received from the packet-switching network into a suitable format used by the POS terminal. During such financial transaction approval or EFT procedures, establishing modem communication may require 5 seconds while the remaining portion of the financial transaction communication may require an additional 10 to 15 seconds, including the time required for establishing communication over the packet-switching network and for packet conversion (e.g. using the DATAPAC 3101 service) and retransmission over the modem line.

A second way in which the POS terminals are connected to the financial transaction processing host is to provide permanent (i.e. connected for at least several hours at a time) connections between the POS terminals and a terminal node device (i.e. a PAD) in communication with the packet-switching network to which the financial transaction processing host is also connected. In this system (e.g. the DATAPAC 3201), no dial-up is needed, and the node PAD polls the POS terminal for data. If a financial transaction authorization is required by the POS terminals, it will respond to the poll by providing a financial transaction request data packet. The PAD assigns an individual circuit number on the packet network to the individual POS terminal or group of networked POS terminal and sends the financial transaction request data in the appropriate packet format over the packet network to the financial transaction processing host. The end-to-end communication is managed by the PAD and the total time to complete authorization for a financial transaction varies between 6 and 12 seconds. The obvious disadvantage with such an arrangement for connecting the POS terminal to the financial transaction processing host is the cost of providing the permanent connection between the POS terminal and the PAD.

Wireless connection between a POS terminal and a financial transaction processing host is disclosed in U.S. Pat. No. 5,544,763. In this Patent, the POS terminal has a choice between dialing out on a regular telephone line or establishing modem communication with a wireless transmitter receiver device so that the financial transaction request data can be communicated to the wireless device for subsequent transmission through a wireless network to reach the financial transaction processing host.

Use of the wireless medium for such data communications has the advantage that physical installation of the data line or telephone line is not required. However, wireless data transmission for POS terminals should be kept to a minimum to use efficiently the limited bandwidth capacity of the wireless system, and it is also important that the total transaction processing time by wireless be approximately the same as or less than the time required for a transaction request to be processed using land lines.

SUMMARY OF THE INVENTION

It is accordingly an object of the present invention to provide a method and apparatus of data network communication for transmitting data between a plurality of remote terminals and a transaction processing host in which the time required to carry out a transaction is minimized while the burden of the amount of data being transmitted over the wireless medium is also minimized.

According to a general aspect of the invention, the object of the invention is provided by providing a virtual circuit (VC) between the financial transaction processing host and a gateway for each one of the terminals for an extended period of time. The gateway is connected to the wireless system and has as its main object to relay data packets received over the wireless system from the terminals for forwarding as data packets over the packet-switching network to the host on the circuit number assigned to the particular terminal sending the packet. This achieves an increase in efficiency and a reduction in time for carrying out financial transactions. This also gives the remote terminal control over end-to-end communication. The packet-switching network can be a public or private network or even a leased line serving only the gateway and the host.

Furthermore, according to a broad aspect of the invention, the gateway checks an exception byte in the data packets received from the terminals to see whether the data packet contains data for forwarding or whether a predetermined circuit management activity is to be carried out by the gateway. If the terminals were to carry out the predetermined circuit management activity directly, the over-the-air traffic would be increased, as would transaction response time. As can be appreciated, the invention strives a balance between transaction speed, volume of over-the-air traffic and processing burden at the gateway.

Similarly, according to another aspect of the invention, the gateway receives packets from the financial transaction processing host, interprets the packets and builds an appropriate exception code for the packet sent to the terminals. This exception code can indicate that a predetermined circuit management activity is being carried out by the gateway, identify which one of a plurality of hosts is communicating through the gateway, and/or indicate other qualities of the data being transmitted., such as compression, encryption and priority.

The remote terminals may be point-of-sale (POS) terminals for bank debit/credit or other financial transaction communications (e.g. EFT), or for recording and/or authorizing purchases for inventory purposes in the case of merchants, or for validation purposes in the case of lottery ticket sale terminals. The remote terminals may be a single module incorporating both the mobile communications device and the POS device in a single unit. Such mobile terminal can be used for taxis or delivery services (e.g. C.O.D. ). They may include screen displays for displaying messages and/or maps, and may also communicate through the gateway with a messaging host to control dispatch, routing and/or inventory.

According to the invention, there is provided a method of data network communication for transmitting data between a plurality of remote terminals and a transaction processing host in which data is transmitted by wireless means from the remote terminals to a wireless station switch in a first wireless data packet format, relayed through the station switch to a network gateway in a second packet format, and transmitted between the gateway through a packet-switching network to the host using a third packet format, wherein: a virtual circuit (VC) on the packet-switching network between the host and the gateway is set up for each one at then terminals; the terminals send packets to the host by addressing the gateway on the station switch; the gateway interprets an exception code in the packet received from the terminals to determine whether a predetermined circuit management activity is to be carried out by the gateway for the purposes of at least one of call requesting, call accepting, acknowledging, negative acknowledging, call clear requesting, call clear confirming, and call reset confirming; and the terminals manage all communication with the host to perform transactions using a transaction protocol based on the third packet format used by the host, the terminals using the exception code to cause the gateway to perform the predetermined circuit management activity without requiring additional wireless transmission. In this way, the terminals fully control end-to-and communication or the transactions with a reduced amount of wireless transmission.

Preferably, the terminals communicate with a plurality of financial transaction processing hosts, and the terminals send packets to one of the hosts by addressing one of a plurality of addresses for the gateway on the station switch. The terminals may communicate only with one of the hosts at a time, and the gateway may have a single circuit number assigned to each one of the terminals and can then send packets received from the host from a corresponding one of the plurality of addresses for the gateway.

Also, in a port save configuration, the terminals preferably send to the host at regular intervals of inactivity a packet message including a heartbeat exception byte indicative of being activated. The gateway intercepts this heartbeat exception byte containing packet and the gateway can automatically take down the virtual circuit for those terminals not having send a heartbeat exception byte code after a predetermined time period longer than the regular interval. This means that whenever one of the remote POS terminals is turned off at the end of the day or during business hours, the capacity at the gateway for virtual circuits will be solved since those circuits not being used will be taken down, awhile the overhead of setting up and taking downs the virtual circuits for each transaction is still saved.

The invention also provides a method of data network communication for transmitting data between a transaction processing host and a plurality of remote terminals in which data is transmitted through a packet-switching network from the host to a network gateway, relayed by the gateway through a wireless station switch, and transmitted by wireless means from the wireless station switch to the remote terminals, wherein: a virtual circuit (VC:) on the packet-switching; network between the host and the gateway is set up for each one of the terminals, the gateway sends packets to the terminals using a terminal identification address corresponding to an address of the VC; the gateway interprets each packet received from the host to build an exception code in each packet to be sent to the terminals, the exception code indicating whether a predetermined circuit management activity is being carried out by the gateway. In this way, end-to-end communication of the transactions is possible with a reduced amount at wireless transmission from the station switch to the terminals.

DETAILED DESCRIPTION OF THE PREFERRED EMBODIMENT

Figure 1:
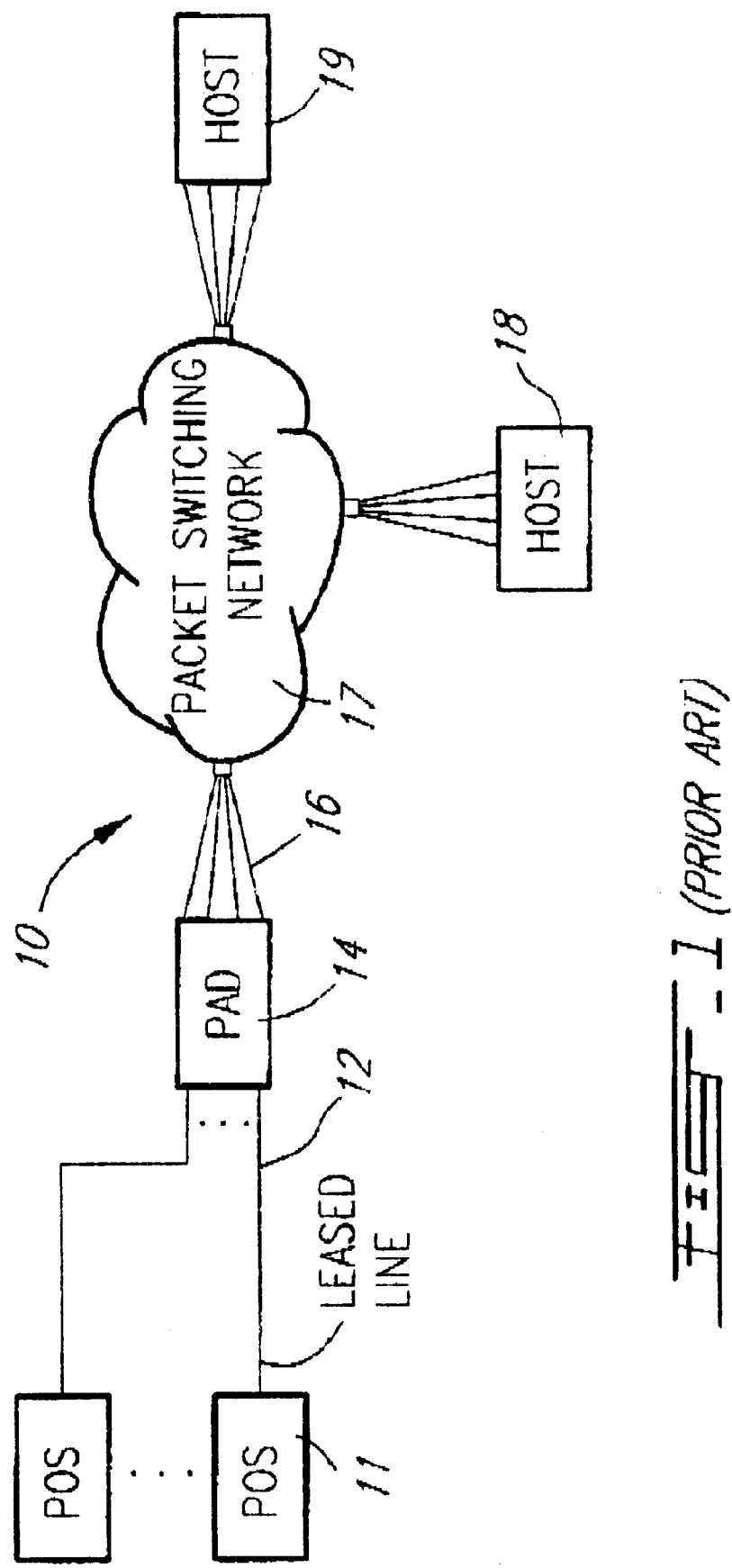
FIG. 1 illustrates a data communication network according to the prior art in which a data link over land lines between point-of-sale terminals and a plurality of financial transaction processing hosts through a packet-switching network is provided.

In the prior art network architecture for point-of-sale terminals as shown in FIG. 1, the network 10 includes a large number of point-of-sale terminals 11 connected by lines 12 to a packet assembler-disassembler (PAD) 14 which provides a number of circuits 16 on a packet-switching network 17 to which at least one financial transaction processing host 18 is connected. In FIG. 1, there is an additional host 19 connected to network 17. In the prior art network 10, PAD 14 polls in a serial fashion, each of the POS devices 11 connected to it to determine whether the device 11 has data to send over the network to one of the hosts 18 or 19. In response to the poll signal on line 12, the POS device will send a transaction request whenever required and the PAD 14 will merely convert the format of the POS device transaction request for sending over network 17 to the, appropriate host. Thus, the PAD device keeps track of virtual circuit (VC) numbers on one of the VC lines 16 associated with the particular device, and converts the packet format before retransmitting over network 17 to the desired host. The PAD 14 similarly reconverts packet format of the data received back from the host 18 or 19 and retransmits the reformatted data to the particular POS terminal 11. The data communication between the POS terminals 11 and the PAD 14 is typically an RS232, RJ45 serial interface. The communication protocol used in the network 10 illustrated in FIG. 1 is known as the dataPac 3201-RAPID communication protocol as established by Telecom Canada. This protocol specifies that a VC is established between the PAD 14 and each of the hosts 18 and 19 for each one of the POS terminals 11. The typical time required for authorization and confirmation of a financial transaction using such a network in Canada is about 10 seconds or less.

Figure 2:
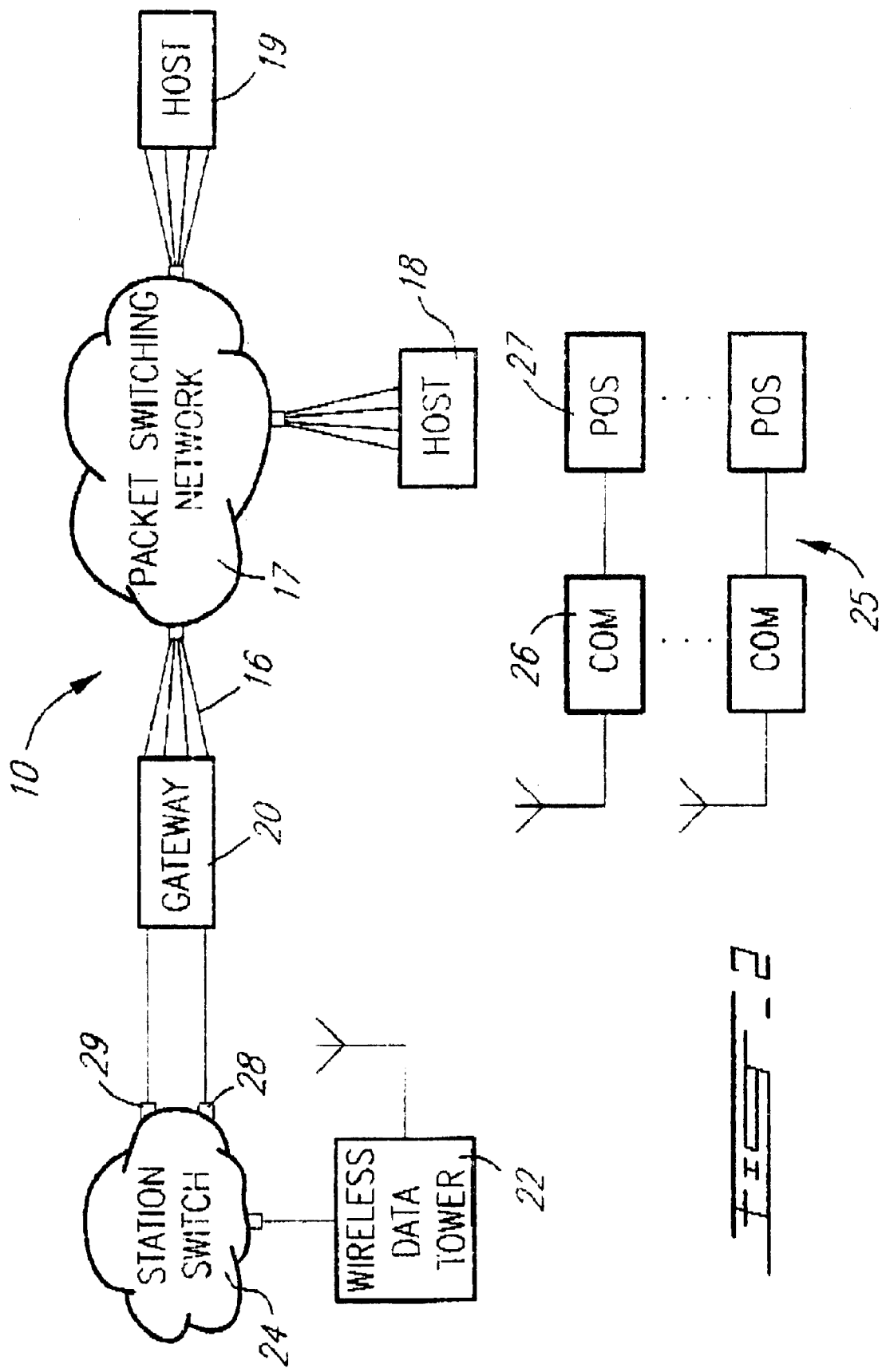
FIG. 2 is a block diagram illustrating the data network according to the preferred embodiment.

In the preferred embodiment of the present invention, the remote point-of-sale terminals 25 as shown in the block diagram of FIG. 2 consist of an RF communication device 26 and a POS device 27. The RF communication device 26 communicate with a wireless data tower 22 connected to a station switch 24. The station switch 24 may be an ARDIS switch running on a Tandem K1000 mainframe computer. The station switch 24 is connected to a gateway 20 at two distinct circuits (addresses) 28 and 29. The gateway may be provided by software running on the same Tandem K1000 used for the station switch 24. The gateway 20 is connected by circuits 16 to the packet-switching network 17 for communication with the hosts 18 and 19.

The network may be a private or public packet switching network such as DataPac X.25 or the HyperStream frame relay. The connection at 16 to the packet switching network can be using Motorola Codex multi-protocol routers. In the preferred embodiment, host 18 is a debit host, while host 19 is a host which processes credit transactions. Of course, a single host can process both types of transactions, and the same or a further host could process other EFT transactions.

When a purchase at the point-of-sale terminal 25 is to be authorized, the POS device 27 gathers the information relating to financial institution card number, purchase amount and other identification information and transmits a financial transaction request to the RF communication device 26. The RF communication device 26 maintains a flag in its memory concerning whether a virtual circuit between gateway 20 and each one of the hosts 18 and 19 is already established for its own use.

If the VC is not already established, device 26 sends a very short message consisting of a single byte of data to tower 22. The RF data packet sent from device 26 to tower 22 identifies the address of the gateway corresponding to one of the hosts 18 or 19, that is, it will either specify the address for circuit 28 or for circuit 29. The gateway 20 receives from the station switch 24 the unit identification. (UID) of the device 26 along with the exception byte. The gateway 20 analyzes the exception byte which, in the present case, indicates that a call is requested to the host. The gateway 20 confirms that device 26 as identified by its UID does not already have a circuit number on circuits 16 assigned to it and if not, allocates one to the device 26. At this point, gateway 20 sends the necessary commands to network 17 to establish the virtual circuit between the particular circuit 16 and the desired host 18 or 19. When the process is complete, the gateway 20 sends an acknowledge signal back to the device 26 by sending an acknowledge message to the particular UID address through the station switch 24 which relays the message to the tower unit 22 for RF transmission. The gateway 20 maintains a table of terminal unit identification addresses and corresponding VC addresses on the packet-switching network 17 and builds for each packet of data transmitted from the gateway 20 to the host 18 or 19 an address header for the X.25 packet format.

Once the VC is set up between the gateway 20 and the host 18 or 19 for the particular device 26, the receipt of a financial transaction request from the POS device 27 will result in device 26 preparing one or more RF packets with an exception byte set to null and sending them to the tower 22, the RF packets being addressed to the appropriate gateway address 28 or 29 depending on the desired host 18 or 19, namely depending on whether a debit or credit transaction is required.

With a typical POS/EFT transaction, the information is sent through to the debit host 18. The debit host 18 then determines that the account and encrypted password are valid and have sufficient funds for the amount of the transaction the host 18 then sends an approval or decline message back to the terminal 25 through the network 17 to the specific circuit number 16 at gateway 20. The gateway 20 receives the packet and reformats it for transmission through the station switch, placing the destination address of the UID of the device assigned the particular circuit number which received the packet. The terminal 25 sends final acknowledgement with additional security codes in the case of a debit EFT transaction. As is known in the art, if the acknowledge message is not received back at the host 18, then the transaction is considered suspended until it can be reversed. Typically, the host financial institution would request that the merchant operating the terminal 25 confirm that the sale was completed.

Figure 3:
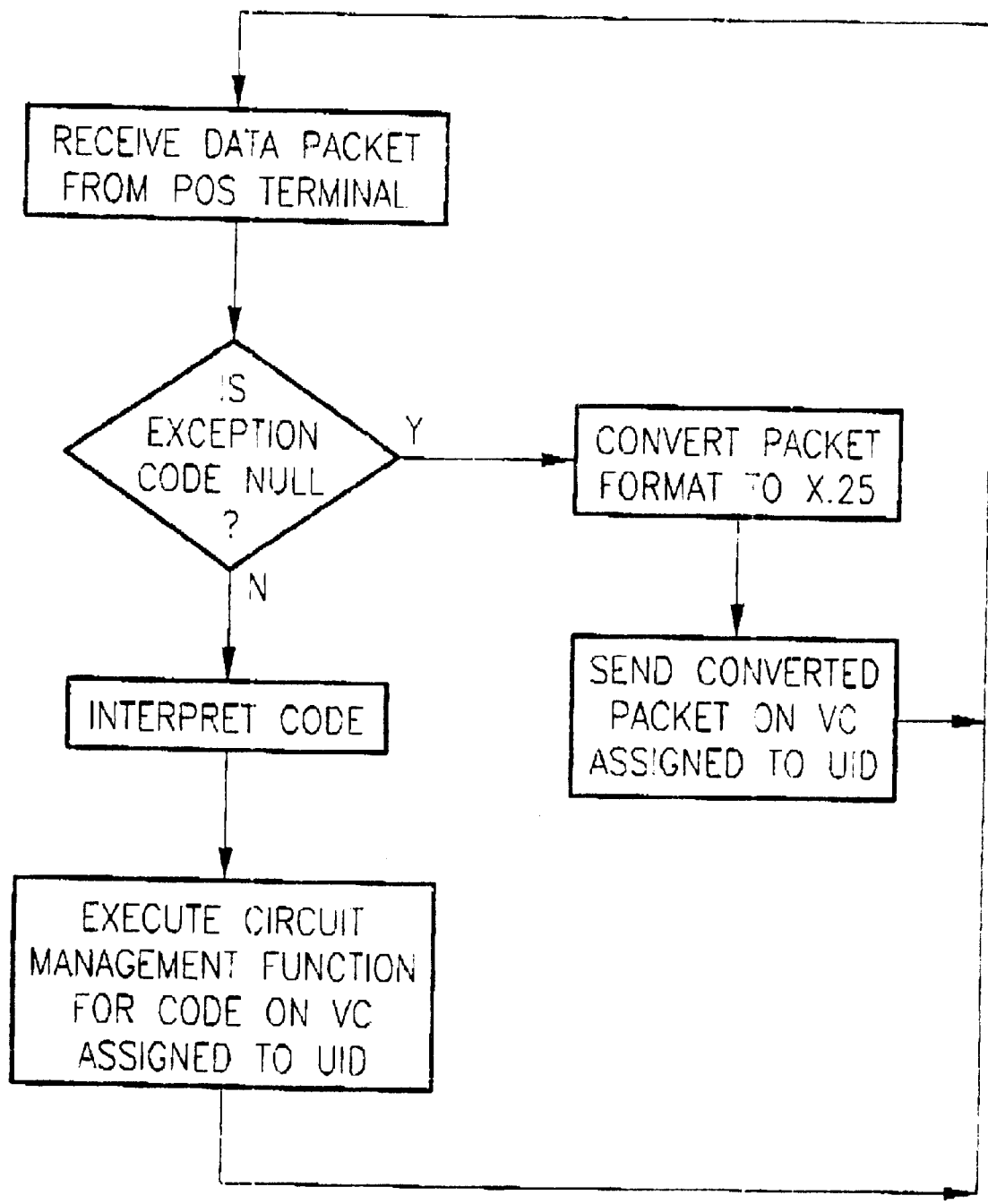
FIG. 3 is a flow diagram illustrating exception code processing at the gateway according to the preferred embodiment.

As illustrated in the block diagram of FIG. 3, the gateway 20 receives a data packet from a given POS terminal and first analyzes the exception byte. If the exception code contained in the exception byte is null, then the gateway 20 realizes that the data in the data packet is message data to be passed on to the particular host 18 or 19 through network 17. Thus, the packet is converted to the network format and sent out on the VC assigned to the UID of the given POS terminal. The network 17 may be a native X.25 network or a frame relay network carrying X.25. An auxiliary ISDN backup line between the gateway 20 and each of the hosts 18 and 19 is also contemplated according to the invention. The exception byte preferably has three bits reserved for the exception code. The exception codes 0 through 7 can then represent the following commands respectively: 000-null; 001-X.25 call request, 010-X.25 call accepted; 011-negative acknowledge (NAK); 100-X.25 clear request; 101-X.25 clear confirm; 110-X.25 reset confirm; and 111-acknowledge (ACK). The exception byte also preferably includes the Q and D packet header bits used in formatting X.25 packets. The gateway 20 may interpret an exception code in the packet received from the terminals to determine whether data is to be forwarded without processing, data is to be forwarded after decompression, data is to be forwarded after decryption, or data is to be forwarded with a predetermined packet header of a type identified by the exception code.

As can be appreciated, a first packet format is used for wireless transmission, a second packet format is used for sending packets through the station switch 24 and a third packet format is used on network 17. As can be further appreciated, device 26 acts with some of the intelligence found in the PAD 14 of the prior art. It is responsible for setting up and taking down virtual circuits between the desired host 18 or 19 and the gateway 20. It is also responsible for selecting the appropriate address 28 or 29 based on the financial transaction request data received from the POS device 27. Device 26 reduces over-the-air communication by using the exception byte to cause gateway 20 to carry out certain circuit management activities and also device 26 specifies the proper state for the Q and D bit values which will be used in the packet headers on network 17. The result is that the gateway 20 requires less intelligence to handle the data communications, while device 26 remains in control of end-to-end communication. By assigning gateway 23 the task of interpreting the exception code and carrying out routine circuit management activities, over-the-air traffic between devices 26 and tower 22 is reduced.

Figure 4:
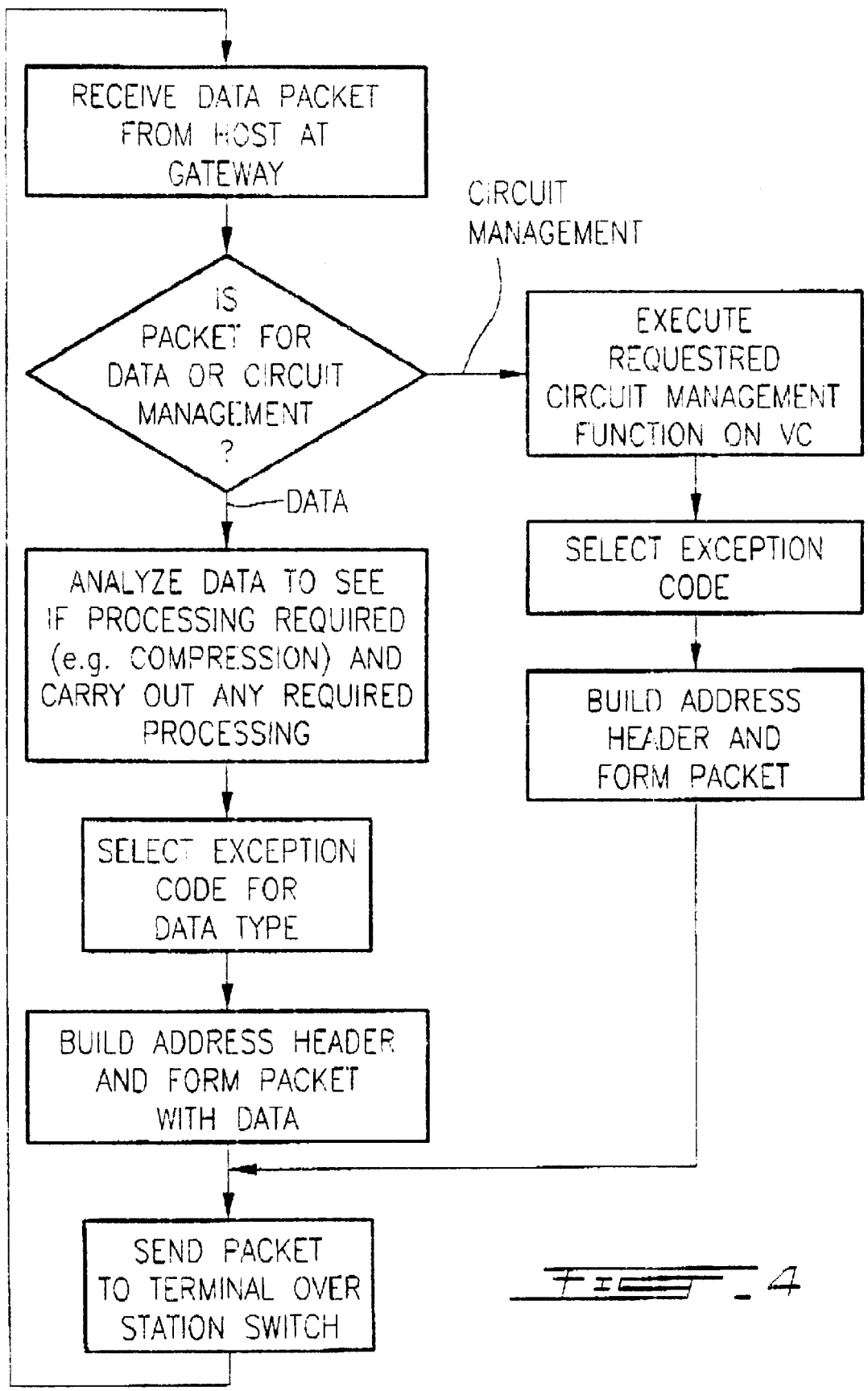
FIG. 4 is a flow diagram illustrating exception code building at the gateway according to the preferred embodiment.

As illustrated in the block diagram of FIG. 4, the gateway 20 receives a data packet from a particular host 18 or 19 through network 17. The packet received is analyzed at the gateway 20 to determine whether data needs to be transferred to the remote terminal or whether a circuit management function has been requested. If a circuit management function is requested, the gateway responds accordingly, for example by sending a command to network 17, and sends a packet to the remote terminal 25 with an exception code indicating that the circuit function is being carried out. When the packet received from a particular host 18 or 19 through network 17 contains data to be forwarded, the gateway examines the data received to determine whether the data has any special characteristics which need to be identified in the exception code so that the terminal 25 finds it easier to handle the data received. For example, the data received from the host may be encrypted or compressed. Furthermore, it may be desirable for the data being sent by wireless transmission to be compressed according to a desired compression algorithm to facilitate wireless transmission, i.e. to keep packet size and numbers down. The gateway 20 can carry out compression or encryption on the data received and forward it to the terminals with an exception code identifying the compression or encryption. The exception code also identifies which one of hosts 18 and 19 sent the data being transferred or sent the request for a circuit management function.

While only two financial transaction hosts 18 and 19 are illustrated in the preferred embodiment, it is possible to provide other hosts connected to the gateway 20. In one embodiment, it would be possible to provide a troubleshooting host having network management capabilities for carrying out diagnostic tests and gathering statistical information which could communicate with hosts 18 and 19 as well as the station switch 24 to test communication with either the terminals 25 or the hosts. The troubleshooting host could be connected with network 17, switch 24 or gateway 20. Proper operation of the POS device 27 and the communications device 26 can be tested. As an additional host, a messaging host Could be provided to communicate dispatch messages to mobile terminals 25. An additional inventory host could also be provided for keeping track of inventory or client purchases (e.g. bonus points nor faithful customers).

In the preferred embodiment, terminals 25 send an acknowledge exception code (ACK) to the gateway 20 after a configurable idle period that may range typically from 15 to 60 minutes. When the gateway 20 receives the ACK, it resets a timer count for the given terminal in its memory, but does not cause any communication over network 17. The ACK can be sent from terminals 25 to only one of the gateway addresses on the station switch 24 corresponding to only one of the hosts 18 and 19. The gateway 20 checks the timer counts for each of the terminals 25 in its memory on a regular basis and if any one timer has a count a few minutes over the idle period, then gateway 20 presumes that the device 26 has been shut down, and the virtual circuit set up for the given terminal 25 between the gateway 20 and the hosts 18 and 19 may be cleared in a "port save" configuration. The gateway 20 confirms that the circuit is cleared and changes the status of the circuit in its memory table as being down. The sending of the acknowledge code may be termed as a "heartbeat" exception code since the code serves to show that the terminal 25 is still active and ready to process financial transaction requests even if none have been requested for the duration of the idle period.

What is claimed is:

1. A method of data network communication for transmitting data between a plurality of remote terminals and a transaction processing host comprising the steps of:
   i) transmitting said data by wireless means from the remote terminals to a wireless station switch in a first data packet format;
   ii) relaying said data through said station switch to a network gateway in a second packet format;
   iii) transmitting said data between said gateway and through a packet switching network to said host using a third packet format; and,
   iv) interpreting an exception code in a response packet received from said terminals to determine whether a predetermined circuit management activity is to be carried out by said gateway, said predetermined circuit management activity being an activity selected from the group consisting of: call requesting; call accepting; acknowledging; negative acknowledging; call clear requesting; call clear confirming; and call reset confirming; said exception code causing said gateway to perform said predetermined circuit management activity without requiring additional wireless transmission, and;
   wherein said remote terminals manage all communications with said host and fully control end-to-end communication of transactions with said host.

2. The method as claimed in claim 1, wherein said gateway maintains a table of terminal unit identification addresses and corresponding virtual circuit addresses on said packet switching network and builds for each packet of data transmitted from said gateway to said host and address header from said third packet format.

3. The method as claimed in claim 1, wherein said gateway interprets said exception code in said response packet received from said terminals to further determine whether data is to be forwarded without processing, data is to be forwarded after decompression, data is to be forwarded after decryption, or data is to be forwarded with a predetermined packet header of a type identified by the exception code.

4. The method as claimed in claim 1, wherein said terminals maintain a flag indicating whether a virtual circuit (VC) on said packet switching network between said host and said gateway is set up or not, and said terminals send call request commands to set up said VC when said flag indicates that said VC is not set up when communication is required.

5. The method as claimed in claim 1, wherein communication between said terminals and a plurality of hosts is provided, said terminals send packets to one of said plurality of hosts by addressing one of a plurality of addresses for said gateway on said station switch.

6. The method as claimed in claim 5, wherein one of said hosts is a messaging host.

7. The method as claimed in claim 5, wherein said terminals communicate only with one of said hosts at a time, said gateway has a single circuit number assigned to each one of said terminals and sends packets received from, said hosts from a corresponding one of said plurality of addresses for said gateway.

8. The method as claimed in claim 1, wherein said terminals send to said host at regular intervals of inactivity a packet message including a heartbeat exception code indicative of being activated, said gateway automatically taking down a virtual circuit (VC) on said packet switching network between said host and said gateway for those terminals not having sent a heartbeat exception code after a predetermined time period longer than said regular interval.

9. The method as claimed in claim 8, wherein said terminals maintain a flag indicating whether said VC between said host and said gateway is set up or not, and said terminals send call request commands to set up said VC when said flag indicates that said VC is not set up when communication is required.

10. The method as claimed in claim 1, wherein said terminals include a transmitter-receiver device connected to a POS device by a fixed line, said transmission of said data from said terminals to said station switch comprises:
   transferring POS transaction data between said POS device and said transmitter-receiver device according to a POS device protocol;

preparing outgoing data packets in said first format including said exception code based on data received from said POS device in said transmitter-receiver device;

sending said first wireless data packets from said transmitter-receiver device to said station switch with an address corresponding to said gateway;

receiving said first wireless data packets from said station switch at said transmitter-receiver device; and converting said first wireless data packets received into POS device protocol data for transfer to said POS device.

11. The method as claimed in claim 7, wherein said terminals send to said host at regular intervals of inactivity a packet message including a heartbeat exception code indicative of being activated, said gateway automatically taking down a virtual circuit (VC) on said packet switching network between said host and said gateway for those terminals not having sent a heartbeat exception code after a predetermined time period longer than said regular interval.

12. The method as claimed in claim 11, wherein said terminals maintain a flag indicating whether said VC between said host and said gateway is set up or not, and said terminals send call request commands to set up said VC when said flag indicates that said VC is not set up when communication is required.

13. The method as claimed in claim 7, wherein said terminals include a transmitter-receiver device connected to a POS device by a fixed line, said transmission of said data from said terminals to said station switch comprises:

transferring POS transaction data between said POS device and said transmitter-receiver device according to a POS device protocol;

preparing outgoing data packets in said first format including said exception code based on data received from said POS device in said transmitter-receiver device;

sending said first wireless data packets from said transmitter-receiver device to said station switch with an address corresponding to said gateway;

receiving said first wireless data packets from said station switch at said transmitter-receiver device; and converting said first wireless data packets received into POS device protocol data for transfer to said POS device.

14. The method as claimed in claim 8, wherein said terminals include a transmitter-receiver device connected to a POS device by a fixed line, said transmission of said data from said terminals to said station switch comprises:

transferring POS transaction data between said POS device and said transmitter-receiver device according to a POS device protocol;

preparing outgoing data packets in said first format including said exception code based on data received from said POS device in said transmitter-receiver device;

sending said first wireless data packets from said transmitter-receiver device to said station switch with an address corresponding to said gateway;

receiving said first wireless data packets from said station switch at said transmitter-receiver device; and converting said first wireless data packets received into POS device protocol data for transfer to said POS device.

15. The method as claimed in claim 1, wherein said remote terminals are POS terminals, and said transaction processing host is a financial transaction processing host of a banking institution.

16. The method as claimed in claim 1, wherein said terminals manage all communications with said host to perform transactions using a transaction protocol based on said third packet format used by said host.

17. The method as claimed in claim 1, wherein said terminals use said exception code to cause said gateway to perform said predetermined circuit management activity without requiring additional wireless transmission, whereby said terminals fully control end-to-end communication of said transactions with a reduced amount of wireless activity.

18. A method for data network communication for transmitting data between a transaction processing host and a plurality of remote terminals comprising the steps of:

i) transmitting data through a packet switching network from said host to a network gateway, ii) interpreting packets received from said host to build an exception code in each packet to be sent to said terminals, the exception code indicating whether a predetermined circuit management activity is being carried out by said gateway;

iii) relaying said data from said gateway through a wireless station switch, and iv) transmitting said data by wireless means from the wireless station switch to said remote terminals, said pre-determined circuit management activity being an activity selected from the group consisting of: call requesting; call accepting; acknowledging; negative acknowledging; call clear requesting; call clear confirming; and call reset confirming;

wherein said exception code causes said gateway to perform said predetermined circuit management activity without requiring additional wireless transmission, and wherein said remote terminals manage all communications with said host and fully control end-to-end communication of transactions with said host.

19. The method as claimed in claim 18, wherein said gateway is in communication with a plurality of hosts, and said exception code includes information to identify one of said hosts.

20. The method as claimed in claim 18, wherein the exception code further indicates at least one of whether data in the packet sent to the terminals is encrypted, whether data in the packet sent to the terminals is compressed, whether data in the packet sent to the terminals is messaging data, and whether data in the packet sent to the terminals is standard transaction data.

21. The method as claimed in claim 18, wherein a virtual circuit on said packet switching network between said host and said gateway is established for each one of said terminals, with said gateway sending packets to said terminals using a terminal identification address corresponding to an address of said virtual circuit.

22. A system for data network communication comprising:

a first transaction processing host;

at least one remote wireless terminal in communication with said first host;

a station switch for receiving data in packet format and relaying said data;

a gateway for receiving said data from said station switch and transmitting data to said host, said gateway for carrying out a predetermined circuit management activity in response to said exception code received from said at least one remote wireless terminal and for generating an exception code message in response to messages received from said host and sending said exception code message to said terminal, wherein said predetermined circuit management is at least one of call requesting, call accepting, acknowledging, negative acknowledging, call clear requesting, call clear confirming, and call reset confirming.

23. The system for data network communications as claimed in claim 22, further comprising a table of terminal unit identification addresses maintained by said gateway.

24. The system of data network communications as claimed in claim 22, wherein said at least one remote wireless terminal include flag indicating means to indicate whether a virtual circuit is established between said host and said gateway.

25. The system of data network communication of claim 22, wherein said system includes two or more transaction processing hosts.

26. The system for data network communications as claimed in claim 22, further comprising a wireless data tower connected to said station switch, said wireless data tower used for communication between said station switch and said wireless terminal.

* * * * *